(12) United States Patent
Lee et al.

(10) Patent No.: US 8,921,258 B2
(45) Date of Patent: Dec. 30, 2014

(54) CATALYST FOR SELECTIVE OXIDATION OF NH3 TO N2 AND METHOD FOR PREPARING THE SAME

(75) Inventors: Seong Ho Lee, Daejeon (KR); Woo Jin Lee, Daejeon (KR); Young Eun Cheon, Daejeon (KR); Seung Hoon Oh, Seoul (KR); Sung Hwan Kim, Daejeon (KR); Hong Seok Jung, Daejeon (KR); Yong Woo Kim, Daejeon (KR); Gi Ho Goh, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 96 days.

(21) Appl. No.: 13/510,182

(22) PCT Filed: Nov. 19, 2010

(86) PCT No.: PCT/KR2010/007810
§ 371 (c)(1),
(2), (4) Date: Oct. 5, 2012

(87) PCT Pub. No.: WO2011/062390
PCT Pub. Date: May 26, 2011

(65) Prior Publication Data
US 2013/0224090 A1 Aug. 29, 2013

(30) Foreign Application Priority Data
Nov. 19, 2009 (KR) .................. 10-2009-0111954

(51) Int. Cl.
| | | |
|---|---|---|
| *B01J 23/00* | (2006.01) | |
| *B01J 23/08* | (2006.01) | |
| *B01J 23/32* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 21/04* | (2006.01) | |
| *B01J 20/00* | (2006.01) | |
| *B01J 27/224* | (2006.01) | |
| *B01J 29/04* | (2006.01) | |
| *B01D 53/94* | (2006.01) | |
| *B01J 23/889* | (2006.01) | |

(52) U.S. Cl.
CPC ............ *B01J 29/04* (2013.01); *B01D 53/9436* (2013.01); *B01J 23/889* (2013.01); *B01D 2255/1023* (2013.01); *B01D 2255/2073* (2013.01); *B01D 2255/20753* (2013.01); *B01D 2255/2092* (2013.01); *Y10S 502/52719* (2013.01)
USPC ........... 502/327; 502/178; 502/324; 502/326; 502/332; 502/333; 502/335; 502/337; 502/339; 502/355; 502/415; 502/439; 502/527.19

(58) Field of Classification Search
CPC .... B01J 37/02; B01J 37/0203; B01J 37/0213; B01J 37/0236; B01J 37/0242; B01J 37/0248; B01J 37/038; B01J 37/08; B01J 37/088; B01J 23/34; B01J 23/44; B01J 23/755; B01J 23/892; B01J 23/8986; B01J 27/224; B01J 21/00
USPC ......... 502/178, 324, 326, 327, 332, 333, 335, 502/337, 339, 355, 415, 439, 527.19
See application file for complete search history.

(56) References Cited

U.S. PATENT DOCUMENTS

| | | | | |
|---|---|---|---|---|
| 4,492,769 A | * | 1/1985 | Blanchard et al. | 502/262 |
| 4,581,343 A | * | 4/1986 | Blanchard et al. | 502/241 |
| 4,837,193 A | * | 6/1989 | Akizuki et al. | 502/242 |
| 5,965,481 A | * | 10/1999 | Durand et al. | 502/304 |
| 5,990,038 A | * | 11/1999 | Suga et al. | 502/303 |
| 6,022,825 A | * | 2/2000 | Andersen et al. | 502/303 |
| 6,284,210 B1 | * | 9/2001 | Euzen et al. | 423/213.5 |
| 6,372,686 B1 | * | 4/2002 | Golden | 502/302 |
| 6,395,675 B1 | * | 5/2002 | Suga et al. | 502/326 |
| 6,551,500 B1 | * | 4/2003 | Ishidai et al. | 208/111.3 |
| 6,746,597 B2 | * | 6/2004 | Zhou et al. | 208/138 |
| 7,037,878 B2 | * | 5/2006 | Liu et al. | 502/326 |
| 7,074,105 B2 | * | 7/2006 | Kawate et al. | 445/51 |
| 7,304,012 B2 | * | 12/2007 | Green et al. | 502/180 |
| 7,569,513 B2 | * | 8/2009 | Schmidt | 502/326 |
| 7,598,203 B2 | * | 10/2009 | Kagami et al. | 502/309 |
| 7,601,668 B2 | * | 10/2009 | Zhou et al. | 502/325 |
| 7,601,669 B2 | * | 10/2009 | Nakamura et al. | 502/326 |
| 7,648,938 B2 | * | 1/2010 | Miyashita et al. | 502/182 |
| 7,790,648 B2 | * | 9/2010 | Dogterom et al. | 502/150 |
| 7,981,390 B2 | * | 7/2011 | Galligan et al. | 423/213.5 |
| 8,110,527 B2 | * | 2/2012 | Liu et al. | 502/439 |
| 8,304,367 B2 | * | 11/2012 | Takahashi et al. | 502/335 |
| 2005/0081443 A1 | * | 4/2005 | Aiello et al. | 48/198.3 |
| 2006/0182676 A1 | | 8/2006 | Tran et al. | |
| 2009/0087367 A1 | | 4/2009 | Liu et al. | |

FOREIGN PATENT DOCUMENTS

| | | |
|---|---|---|
| CN | 101190410 A | 6/2008 |
| CN | 101568381 A | 10/2009 |
| JP | 7328440 A | 12/1995 |
| JP | 9313940 A | 12/1997 |
| JP | 10249165 A | 9/1998 |
| JP | 1142422 A | 2/1999 |
| JP | 3546908 B2 | 4/2004 |

\* cited by examiner

*Primary Examiner* — Cam N. Nguyen
(74) *Attorney, Agent, or Firm* — The Webb Law Firm

(57) ABSTRACT

Disclosed is a catalyst which can convert ammonia contained in exhaust gas from an engine of a vehicle equipped with a Urea-SCR (Urea-Selective Catalytic Reduction) system, to nitrogen, and a method for preparing the same. The catalyst can convert ammonia which is failed to participate in a conversion reaction of NOx to N2 and slipped out of the SCR catalyst, to nitrogen via a SCO (Selective Catalytic Oxidation) reaction, before the ammonia is released to the air.

11 Claims, No Drawings

US 8,921,258 B2

CATALYST FOR SELECTIVE OXIDATION OF NH3 TO N2 AND METHOD FOR PREPARING THE SAME

TECHNICAL FIELD

The present invention relates to a catalyst which can convert the residual ammonia ($NH_3$), after a nitrogen ($N_2$) treatment of nitrogen oxides ($NO_x$) in exhaust gas from the vehicles equipped with a Urea-SCR (Urea-Selective Catalytic Reduction) system, to nitrogen ($N_2$) via the selective oxidation reaction of ammonia before being released into the air; to a method for preparing the same; and to a method for reducing ammonia by using the same as a catalyst for selective oxidation of ammonia.

BACKGROUND ART

In recent years, with increasing concerns on air pollution, various efforts has been being made for reducing nitrogen oxides ($NO_x$) from internal combustion engines in industrial boilers, vehicles or the like. The most widely used commercial technique for removing nitrogen oxides is currently SCR (Selective Catalyst Reduction) technique in which nitrogen oxides are converted, through a catalytic reduction reaction, to harmless substances, i.e. water and diatomic nitrogen by using ammonia as a reducing agent. However, the reducing agent, ammonia has disadvantages such that its transport, storage and handling are difficult, owing to its explosiveness, unpleasant strong odor and toxicity. Accordingly, techniques using solid urea or an aqueous urea solution which is relatively easy to transport, store and handle have been attracting attention. Urea has a chemical structure in which two amino groups are joined by the carbon of a carbonyl (—C═O) group, and is converted to ammonia which makes possible to selectively convert nitrogen oxides to $N_2$, in the event of exhaust gas emission from an internal combustion engine of a vehicle equipped with a SCR system.

However, some of ammonia converted from urea fails to participate in the reductive conversion of nitrogen oxides to $N_2$ and is released into the air, thereby raising an additional problem of being another cause of air pollution.

Concerning its inflammability and toxicity, ammonia-containing exhaust gas should not be released into the air as it is, and needs further treatment for removing ammonia so as to eliminate its dangerous and toxic properties.

There are wet processes, combustion processes and dry processes in exhaust gas treatment methods. In the wet processes, exhaust gas is cleansed by chemical liquid; in the combustion processes, exhaust gas is further burned at a high temperature by a burner or the like, thereby resulting in harmless gas; and in the dry processes, a stream of exhaust gas passes through a column charged with a solid treatment agent or a decomposition catalyst, wherein the gas to be treated is absorbed to the treatment agent via chemical interactions therebetween, i.e. adsorption and/or chemical reactions, or is converted to harmless substances by the catalyst. The dry processes are often used in the treatment of exhaust gases such as metal hydride-containing gas, halide-containing gas or ammonia-containing gas.

In the meantime, when using the wet processes, waste water from the process contains ammonia, and thus it requires further waste water treatment. The combustion processes also have a problem such that $NO_x$ generated from ammonia combustion needs to be further treated.

Many techniques related to an ammonia-reducing catalyst for reducing ammonia through the dry processes have been known in this field of art. For example, as ammonia-reducing catalysts, Japanese Laid-Open Patent Publication No. Hei 11-042422 discloses copper oxide, chrome oxide, manganese oxide, iron oxide, palladium, platinum and the like; Japanese Laid-Open Patent Publication No. Hei 07-328440 discloses chrome, copper or cobalt supported on zeolite; or Japanese Laid-Open Patent Publication No. Hei 10-249165 discloses metal elements of Group 8 and/or Group 1B in the periodic table of elements (sub-Group format).

However, although the catalysts prepared from such copper oxide, chrome oxide, manganese oxide, iron oxide, palladium or platinum have an excellent ammonia reducing rate, these catalysts do not yield $N_2$ with high selectivity, but also generate nitrogen oxides such as $N_2O$, $NO_2$ and NO, thereby causing further environmental problem.

Moreover, regarding the catalysts in which chrome, copper or cobalt is supported on zeolite, although the object thereof is to reduce ammonia, while inhibiting the generation of nitrogen oxides as much as it possible, the gas to be treated was found to have only very low concentration of ammonia such as 30 ppm and also a very low concentration of oxygen such as 2%. It means that the catalysts are only effective in very restricted conditions. Since the ammonia concentration in exhaust gas from a semiconductor manufacturing process or the like are very high as several %, and the oxygen concentration is also as high as the oxygen concentration in the air, generation of nitrogen oxides such as $N_2O$, $NO_2$ and NO cannot be avoided when using the above supported catalysts.

The catalysts containing metal elements of Group 8 and/or Group 1B in the periodic table of elements (sub-Group format) may reduce ammonia at a low temperature without generating nitrogen oxides due to the presence of hydrogen as a reducing agent, however it is disadvantageous in terms of process economy since it requires hydrogen as an essential component.

DISCLOSURE OF INVENTION

Technical Problem

The object of the present invention is to provide a catalyst for converting ammonia contained in exhaust gas from a vehicle equipped with a Urea-SCR system to nitrogen gas via selective oxidation of the ammonia; a method for preparing the same; and thus a method for reducing ammonia by contacting said catalyst with ammonia-containing exhaust gas so as to convert ammonia to a nitrogen gas through a selective oxidation reaction.

Solution to Problem

For achieving the above object, the present invention is to provide a catalyst which can selectively oxidize unreacted ammonia to nitrogen ($N_2$) before the unreacted ammonia is released to the air, wherein the unreacted ammonia is resulted from the reduction reaction of converting nitrogen oxides contained in exhaust gas from an engine of a vehicle equipped with a Urea-SCR system to nitrogen ($N_2$) by using ammonia which has been converted from Urea; a method for preparing the same; and a method for reducing ammonia using the same.

The present invention is to provide a catalyst which can selectively oxidize and thus convert ammonia to nitrogen, specifically to provide a catalyst for conversion of ammonia to nitrogen via a selective oxidation of ammonia, wherein the catalyst includes palladium and either of nickel or manganese supported on a support coated with a carrier; a method for preparing the same; and a method for reducing ammonia using the same.

Hereinafter, the present invention is further described in detail.

The present invention provides a method for preparing a catalyst for conversion of ammonia to nitrogen via a selective oxidation of ammonia, comprising:

(a) coating carrier slurry over a support, and drying and firing the coated support; and (b) impregnating the carrier-coated support from the above step (a) with a mixed aqueous solution wherein palladium or a palladium compound and another component selected from nickel, a nickel compound, manganese and a manganese compound are dissolved, and then drying and firing the resulted product.

The carrier which may be used in the present invention can be selected from alumina, zeolite, silica and zirconia, and alumina is most preferably used. Alumina is not specifically limited in terms of the species, particle properties such as surface area, pore volume, particle shape, specific gravity and the like, and preferably used may be alumina having a crystal structure of an amorphous, gamma ($\gamma$), theta ($\theta$) or eta ($\eta$) type and more preferably used is alumina having surface area of 100-1000 $m^2/g$, pore volume of 0.1-1.5 cc/g, specific gravity of 0.5-1.5 g/cc and a particle size of 0.1-10 micrometer.

The carrier slurry used in the step (a) of the present invention is prepared by mixing alumina with distilled water and further adding acetic acid for improving its coating property.

As for the support used in the present invention, any ceramic supports well-known in this field of art may be used, and particularly a fire-resistant 3-dimensional structure, referred as "a ceramic honeycomb" may be used. The ceramic honeycomb support is preferably selected from any one made of cordierite, silicon carbide, illite, mullite, zirconia, titania, aluminum titanate, bellite, spodumene, aluminosilicate and magnesium silicate. Among the above listed, cordierite or silicon carbide ceramic honeycomb is most preferably used.

The drying condition and firing condition in the step (a) and step (b) are independent to each other, wherein the drying process is preferably carried out at 80-150° C. for 1-6 hours, and the firing process is preferably carried out at 450-600° C. for 1-6 hours. When the drying temperature is lower than 80° C., drying is conducted slowly and thus it is inefficient in terms of productivity, and when the temperature is higher than 150° C., sudden desorption of moisture from a catalyst may occur, which may cause a problem of disintegration in the porous structure of a catalyst. When the firing temperature is lower than 450° C., it causes a problem in that the decomposition of a metal precursor cannot be completed, thereby leaving residues thereof, and when it is higher than 600° C., metal becomes sintered, resulting in lowering of the catalyst activity.

In the step (b), the palladium compound may be selected from palladium nitrate, palladium acetate, palladium halide, palladium oxide and palladium sulfate; the nickel compound may be selected from nickel nitrate and nickel acetate; and the manganese compound may be selected from manganese nitrate and manganese acetate.

In the step (b), the process for impregnating the carrier with palladium and either of nickel or manganese from a mixed aqueous solution in which palladium or a palladium compound and any one selected from nickel, a nickel compound, manganese and a manganese compound may be a washcoating process.

The mixed aqueous solution is preferably prepared by mixing 0.1-15 wt % of metal components with deionized water so as to uniformly support the metal components on the carrier. The total amount of the metal components to be supported on the carrier is preferably 0.1-10 wt %. Depending on the amount being supported on the carrier, the amount of metal components to be added may be determined. When the amount being supported on the carrier is less than 0.1 wt %, the catalyst performance per catalyst volume may be lowered due to the insufficient amount of active metal, and when it is more than 10 wt %, the excessive amount of active metal supported on the carrier cause a decrease in dispersion, which may cause a further problem of lowering the catalyst performance as compared to the amount of precious metal.

Moreover, nickel or manganese among the metal components is preferably supported to the amount, as calculated on the metal basis, of 1-100 wt %, based on the weight of palladium. Depending on the supported amount, the amount of any one selected from nickel, a nickel compound, manganese and a manganese compound to be added to the mixed aqueous solution may be determined.

To the mixed aqueous solution of the present invention, a carboxylic acid derivative may be further added, other than the above metal components. The carboxylic acid derivative may be added to the amount of 10-100 mol %, and preferably 50-100 mol %, based on the total 100 mol % of the metal components, as calculated on a metal basis. By further adding a carboxylic acid derivative to the mixed aqueous solution, it is possible to prepare a catalyst which is more improved in the capability of converting ammonia to nitrogen. Although the reason for such improvement in selective oxidation of ammonia by adding a carboxylic acid derivative to the mixed aqueous solution has not yet been clearly found, it is anticipated that a carboxylic acid forms a complex with two metal components, resulting in formation of single unit catalysts structure having two metals well-distributed on the carrier surface after firing, and such catalyst structure further improves the catalyst performance.

The carboxylic acid derivative further added to the mixed aqueous solution of the present invention may be selected from monocarboxylic acid derivatives, dicarboxylic acid derivatives, tricarboxylic acid derivatives and tetracarboxylic acid derivatives. As for the specific examples of the carboxylic acid derivatives, mentioned may be malic acid, formic acid, citric acid, alanine, asparagine, aspartic acid, benzyl aspartic acid, cystein, glutamic acid, glutamine, glycine, histidine, isoleucine, leucine, lysine, methionine, ornithine, phenylalanine, proline, serine, threonine, tryptophan, tyrosine and valine. At least one selected from the above-listed compounds may be used as the carboxylic acid derivative and citric acid is most preferably employed.

The catalyst for conversion of ammonia to nitrogen via selective oxidation of ammonia prepared according to the above-described method is characterized in that the total amount of palladium and either of nickel or manganese supported on the carrier coated over support is 0.1-10 wt % based on the weight of the carrier, and the amount of nickel or manganese supported on the carrier is 1-100 wt % based on the weight of palladium.

The catalyst for conversion of ammonia to nitrogen via selective oxidation of ammonia prepared according to the present invention is in contact with exhaust gas containing several vol. ppm to several ten thousands of vol. ppm, preferably 10 to 10,000 vol. ppm of ammonia concentration, to convert the ammonia to nitrogen via selective oxidation of ammonia, thereby being capable of purifying the exhaust gas which contains harmful components and then releasing it as a harmless gas. When contacting exhaust gas having the above-mentioned amount of ammonia with a catalyst of the present invention, at 250?, the NH₃ conversion rate is 40-95%, and the yield of N₂ is 40-91%; and at 400?, the NH₃ conversion rate is 100%, and the yield of N₂ is 60-80%. Such results meet the Euro-5 recommendation and Euro-6 emission standards which are related to the European ammonia emission standards. The catalyst for conversion of ammonia to nitrogen via selective oxidation of ammonia according to the present invention may be used in purification of exhaust gas by being equipped in Urea SCR exhaust purification system of a diesel engine vehicle.

Advantageous Effects of Invention

A catalyst in which palladium and either of nickel or manganese are supported at a certain mixing ratio according to the present invention exhibits excellent conversion of ammonia to nitrogen, and an excellent catalyst performance over a wide temperature range as compared to the conventional catalysts.

BEST MODE FOR CARRYING OUT THE INVENTION

Hereinafter, the present invention is further described in detail with reference to the following Examples. However, it should be understood that these Examples have only illustrative purpose and by no means limit the scope of the present invention.

Example 1

Homogenous alumina slurry was prepared by mixing a γ-alumina powder [Al-1, specific surface area: 210 m²/gr, pore volume: 0.5 cc/gr, specific gravity: 0.8 g/cc], acetic acid and secondary distilled water, and grinding the resulted mixture in a wet ball mill for 24 hours. The average particle size of alumina ground in the wet ball mill was adjusted to be 2-8 micrometers.

With the resulted alumina slurry, a cordierite honeycomb having a dimension of 2.5 (cm)×2.5 (cm)×2.5 (cm) and 400 cpsi was washcoated to the degree that the amount of alumina supported thereon was obtained to be 0.244 g/cm³. The coated honeycomb was placed into a firing kiln, wherein the temperature was increased from a normal temperature to 120° C., at the rate of 5° C./minute and the coated honeycomb was dried at 120° C. for 2 hours. Then, the temperature was further raised from 120° C. to 550° C. at the rate of 5° C./minute and it was fired at 550° C. for 3 hours.

The fired alumina coated cordierite support was impregnated with 100 ml of a mixed aqueous solution of palladium nitrate and nickel nitrate wherein the total metal content was 1.0 wt % and the mixing ratio of palladium:nickel by weight was 1.7:1.3. Next, the impregnated cordierite-supported alumina carrier was fired as in the above-described firing of the washcoated honeycomb, thereby preparing a catalyst according to the present invention.

Example 2

A catalyst was prepared by the method as described in above Example 1, except that the total metal content was 1.0 wt % and the mixing ratio of palladium:nickel by weight was 2.0:1.0 in the mixed aqueous solution for supporting metal.

Example 3

A catalyst was prepared by the method as described in above Example 1, except that the total metal content was 1.0 wt % and the mixing ratio of palladium:nickel by weight was 2.3:0.7 in the mixed aqueous solution for supporting metal.

Example 4

A catalyst was prepared by the method as described in above Example 1, except that the total metal content was 1.0 wt % and the mixing ratio of palladium:nickel by weight was 2.5:0.5 in the mixed aqueous solution for supporting metal.

Example 5

A catalyst was prepared by the method as described in above Example 1, except that the total metal content was 1.0 wt % and the mixing ratio of palladium:nickel by weight was 2.7:0.3 in the mixed aqueous solution for supporting metal.

Example 6

A catalyst was prepared by the method as described in above Example 1, except that the total metal content was 1.0 wt % and the mixing ratio of palladium:nickel by weight was 2.9:0.1 in the mixed aqueous solution for supporting metal.

Example 7

A catalyst was prepared by the method as described in above Example 1, except that a mixed aqueous solution of palladium nitrate and manganese nitrate was used for supporting metal, wherein the total metal content was 1.0 wt % and the mixing ratio of palladium:manganese by weight was 1.7:1.3 in the mixed aqueous solution.

Example 8

A catalyst was prepared by the method as described in above Example 1, except that a mixed aqueous solution of palladium nitrate and manganese nitrate was used for supporting metal, wherein the total metal content was 1.0 wt % and the mixing ratio of palladium:manganese by weight was 2.0:1.0 in the mixed aqueous solution.

Example 9

A catalyst was prepared by the method as described in above Example 1, except that a mixed aqueous solution of palladium nitrate and manganese nitrate was used for supporting metal, wherein the total metal content was 1.0 wt % and the mixing ratio of palladium:manganese by weight was 2.3:0.7 in the mixed aqueous solution.

Example 10

A catalyst was prepared by the method as described in above Example 1, except that a mixed aqueous solution of palladium nitrate and manganese nitrate was used for supporting metal, wherein the total metal content was 1.0 wt % and the mixing ratio of palladium:manganese by weight was 2.5:0.5 in the mixed aqueous solution.

Example 11

A catalyst was prepared by the method as described in above Example 1, except that a mixed aqueous solution of palladium nitrate and manganese nitrate was used for supporting metal, wherein the total metal content was 1.0 wt % and the mixing ratio of palladium:manganese by weight was 2.7:0.3 in the mixed aqueous solution.

Example 12

A catalyst was prepared by the method as described in above Example 1, except that a mixed aqueous solution of palladium nitrate and manganese nitrate was used for supporting metal, wherein the total metal content was 1.0 wt % and the mixing ratio of palladium:manganese by weight was 2.9:0.1 in the mixed aqueous solution.

Example 13

A catalyst was prepared by the method as described in above Example 3, except that citric acid was dissolved into the mixed aqueous solution used for supporting metal, at the molar amount of 2/3 of the molar amount of the total metal component.

Example 14

A catalyst was prepared by the method as described in above Example 4, except that citric acid was dissolved into the mixed aqueous solution used for supporting metal, at the molar amount of 2/3 of the molar amount of the total metal component.

Example 15

A catalyst was prepared by the method as described in above Example 5, except that citric acid was dissolved into the mixed aqueous solution used for supporting metal, at the molar amount of 2/3 of the molar amount of the total metal component.

Example 16

A catalyst was prepared by the method as described in above Example 9, except that citric acid was dissolved into the mixed aqueous solution used for supporting metal, at the molar amount of 2/3 based on the molar amount of the total metal component.

Example 17

A catalyst was prepared by the method as described in above Example 10, except that citric acid was dissolved into the mixed aqueous solution used for supporting metal, at the molar amount of 2/3 of the molar amount of the total metal component.

Example 18

A catalyst was prepared by the method as described in above Example 11, except that citric acid was dissolved into the mixed aqueous solution used for supporting metal, at the molar amount of 2/3 of the molar amount of the total metal component.

Comparative Example 1

A catalyst was prepared by the method as described in above Example 1, except that an aqueous solution of palladium nitrate was used instead of the mixed aqueous solution for supporting metal, and the total metal content of the aqueous solution was 1.0 wt %.

Comparative Example 2

A catalyst was prepared by the method as described in above Example 1, except that an aqueous solution of silver nitrate was used instead of the mixed aqueous solution for supporting metal, and the total metal content of the aqueous solution was 1.0 wt %.

Comparative Example 3

A catalyst was prepared by the method as described in above Example 1, except that an aqueous solution of silver nitrate was used instead of the mixed aqueous solution for supporting metal, and the total metal content of the aqueous solution was 5.0 wt %.

Comparative Example 4

A catalyst was prepared by the method as described in above Example 1, except that an aqueous solution of silver nitrate was used instead of the mixed aqueous solution for supporting metal, and the total metal content of the aqueous solution was 10.0 wt %.

Comparative Example 5

A catalyst was prepared by the method as described in above Example 1, except that an aqueous solution of copper nitrate was used instead of the mixed aqueous solution for supporting metal, and the total metal content of the aqueous solution was 1.0 wt %.

Comparative Example 6

A catalyst was prepared by the method as described in above Example 1, except that an aqueous solution of copper nitrate was used instead of the mixed aqueous solution for supporting metal, and the total metal content of the aqueous solution was 5.0 wt %.

Comparative Example 7

A catalyst was prepared by the method as described in above Example 1, except that an aqueous solution of copper nitrate was used instead of the mixed aqueous solution for supporting metal, and the total metal content of the aqueous solution was 10.0 wt %.

[Evaluation of Catalyst Capability of Converting Ammonia to Nitrogen (N2)]

The honeycomb catalysts prepared in the above Examples 1 to 18 and the Comparative examples 1 to 7 were tested for their ammonia content reducing capability and conversion to nitrogen oxides, by using a gas mixture model which has similar composition to real car exhaust gas. The honeycomb catalyst was fixed into a stainless steel reactor, thermocouple was placed at the front end as well as at the rear end of the catalyst. The reactor temperature was precisely adjusted by using a cylindrical firing kiln.

The flow rate of each gas to be reacted was precisely adjusted by using a mass flowmeter, and at this time the space velocity of the reactants was 50,000 hr$^{-1}$.

Composition of the simulated exhausted gas fed into the reactor was represented in the following Table 1.
Table 1

TABLE 1

| NH$_3$ | O$_2$ | Balance |
|---|---|---|
| 121 ppm | 10% | N$_2$ |

At the front end and the rear end of the reactor, the concentration of NH3 in the simulated exhaust gas was measured by using a Fourier Transform infrared (FRIR) spectroscopic gas analyzer directly connected to the reactor at a temperature as high as 250° C., and the concentrations of NO, NO$_2$ and N$_2$O were continuously measured by using a gas analyzer employing Non-Dispersive Infrared (NDIR) spectroscopy. The results were represented in the following Table 2.

The temperature of exhaust gas from a vehicle greatly fluctuates during driving according to speed reduction and acceleration. Considering such vehicle characteristics, vehicles may be classified into vehicles with high exhaust gas temperature and vehicles with low exhaust gas temperature based on vehicle driving characteristics, and according to the type of a vehicle, catalysts with different characteristics should be applied. The ammonia reducing rate of a catalyst is generally increased according to the increase in temperature, however, at a relatively high temperature, the amount of ammonia converted to NOx is increased, thereby being possible to have a disadvantageous effect on the purification of NOx generated from a vehicle. Catalysts having a good ammonia reducing rate at low temperature naturally have even better ammonia reducing rate at high temperature, however a relatively larger amount of ammonia may be converted to NOx as compared to other catalysts. Considering such catalyst characteristics, it is determined that catalysts from the above examples 3, 4, 5, 9, 10, 11, 15 and 18 seem to be particularly suitable, taking account of purification of both ammonia and NOx in exhaust gas. In case of a vehicle of which exhaust gas temperature is mainly in the low temperature range of ~250° C., the catalysts from the above examples 9, 15 and 18 may be advantageously used, and in case of a vehicle of which exhaust gas temperature is mainly in the high temperature range of ~450° C., catalysts from the above examples 3, 4 and 5 may be preferably applied. The exemplified temperatures, 250° C. and 450° C. are not representative temperature for each low and high temperature range, but optionally proposed temperature only for classifying the catalyst characteristics.

TABLE 2

| | 250 °C. | | 450 °C. | |
|---|---|---|---|---|
| | NH$_3$ conversion rate (%) | N$_2$ yield (%) | NH$_3$ conversion rate (%) | N$_2$ yield (%) |
| Example 1 | 56 | 51 | 100 | 72 |
| Example 2 | 62 | 58 | 100 | 76 |
| Example 3 | 61 | 57 | 100 | 70 |
| Example 4 | 72 | 68 | 100 | 70 |
| Example 5 | 68 | 65 | 100 | 72 |
| Example 6 | 42 | 40 | 100 | 69 |
| Example 7 | 62 | 55 | 100 | 63 |
| Example 8 | 75 | 69 | 100 | 65 |
| Example 9 | 92 | 88 | 100 | 63 |
| Example 10 | 88 | 83 | 100 | 60 |
| Example 11 | 79 | 73 | 100 | 62 |
| Example 12 | 84 | 78 | 100 | 57 |
| Example 13 | 85 | 79 | 100 | 61 |
| Exempla 14 | 94 | 91 | 100 | 61 |
| Example 15 | 95 | 91 | 100 | 63 |
| Example 16 | 78 | 73 | 100 | 63 |
| Example 17 | 88 | 85 | 100 | 64 |
| Example 18 | 91 | 88 | 100 | 63 |
| Comparative example 1 | 36 | 34 | 100 | 72 |
| Comparative example 2 | 28 | 28 | 68 | 36 |
| Comparative example 3 | 100 | 97 | 100 | 37 |
| Comparative example 4 | 100 | 97 | 100 | 30 |
| Comparative example 5 | 28 | 27 | 98 | 63 |
| Comparative example 6 | 29 | 26 | 100 | 43 |
| Comparative example 7 | 33 | 30 | 100 | 35 |

The invention claimed is:

1. A method for preparing a catalyst for selective oxidation of ammonia, comprising:
   (a) coating a carrier over a support, and drying and firing the carrier-coated support; and
   (b) impregnating the carrier-coated support from step (a) with a mixed aqueous solution comprising palladium or a palladium compound and another component selected from a group consisting of nickel, a nickel compound, manganese and a manganese compound and drying and firing the resulting product.

2. The method for preparing a catalyst for selective oxidation of ammonia according to claim 1, wherein the mixed aqueous solution further includes a carboxylic acid derivative added thereto.

3. The method for preparing a catalyst for selective oxidation of ammonia according to claim 2, wherein the carboxylic acid derivative is one selected from the group consisting of malic acid, formic acid, citric acid, alanine, arginine, asparagine, aspartic acid, benzyl aspartic acid, cystein, glutamic acid, glutamine, glycine, histidine, isoleucine, leucine, lysine, methionine, ornithine, phenylalanine, proline, serine, threonine, tryptophan, tyrosine and valine.

4. The method for preparing a catalyst for selective oxidation of ammonia according to claim 3, wherein the carboxylic acid derivative is citric acid.

5. The method for preparing a catalyst for selective oxidation of ammonia according to claim 1, wherein the carrier is alumina having a crystal structure of amorphous, gamma($\gamma$), theta($\theta$) or eta($\eta$) type.

6. The method for preparing a catalyst for selective oxidation of ammonia according to claim 1, wherein step (a) and step (b) are independently carried out under 80-150° C. of drying condition and 450-600° C. of firing condition.

7. The method for preparing a catalyst for selective oxidation of ammonia according to claim 1, wherein in step (b), the palladium compound is selected from a group consisting of palladium nitrate, palladium acetate, palladium halide, palladium oxide and palladium sulfate; the nickel compound is selected from a group consisting of nickel nitrate and nickel acetate; and the manganese compound is selected from a group consisting of manganese nitrate and manganese acetate.

8. The method for preparing a catalyst for selective oxidation of ammonia according to claim 1, wherein the support is a silicon carbide or cordierite honeycomb.

9. The method for preparing a catalyst for selective oxidation of ammonia according to claim 1, wherein the process for impregnating the carrier with a metal component in the step (b) is a washcoating process.

10. The method for preparing a catalyst for selective oxidation of ammonia according to claim 1, wherein the metal components in the mixed aqueous solution used in step (b) are mixed to the amount that 0.1-10 wt % of metal components, as calculated on a metal basis, is supported to the carrier.

11. The method for preparing a catalyst for selective oxidation of ammonia according to claim 1, wherein, the mixed aqueous solution in step (b) includes, as calculated on a metal basis, 1-100wt % of one selected from nickel, a nickel compound, manganese and a manganese compound based on the weight of palladium.

\* \* \* \* \*